United States Patent [19]

Cosgrove

[11] Patent Number: 4,905,949
[45] Date of Patent: Mar. 6, 1990

[54] DEVICE FOR RELEASABLY SUPPORTING A PLURALITY OF OBJECTS

[76] Inventor: James H. Cosgrove, 7964 Crystal Blvd., Diamond Springs, Calif. 95619

[21] Appl. No.: 309,170

[22] Filed: Feb. 13, 1989

[51] Int. Cl.⁴ ................................................ A47K 1/08
[52] U.S. Cl. .................................. 248/312.1; 211/74; 248/313
[58] Field of Search ...................... 248/312.1, 312, 310, 248/311.2, 311.3, 313, 316.7, 318; 211/71, 89, 73, 74, 88, 113

[56] References Cited

U.S. PATENT DOCUMENTS

| | | | |
|---|---|---|---|
| 1,761,218 | 6/1930 | Lundy et al. | 248/312.1 |
| 2,467,383 | 4/1949 | Huff | 248/316.7 X |
| 2,832,475 | 4/1958 | Linsley | 211/89 X |
| 2,954,876 | 10/1960 | Mathews | 211/74 |
| 2,958,496 | 11/1960 | Johnson | 248/313 X |
| 3,202,291 | 8/1965 | Root | 248/316.7 X |
| 3,224,594 | 12/1965 | Schweitzer | 211/74 |
| 3,498,470 | 3/1970 | Thomas | 211/74 |
| 3,527,345 | 9/1970 | Iorio | 211/74 X |
| 3,655,063 | 4/1972 | Landry | 211/71 |
| 4,008,810 | 2/1977 | Merz | 211/74 X |

Primary Examiner—J. Franklin Foss
Attorney, Agent, or Firm—Thomas R. Lampe

[57] ABSTRACT

A device for releasably supporting a plurality of objects such as cans and which allows the selective removal or replacement of any one of the objects without disturbing the others releasably supported thereby.

10 Claims, 1 Drawing Sheet

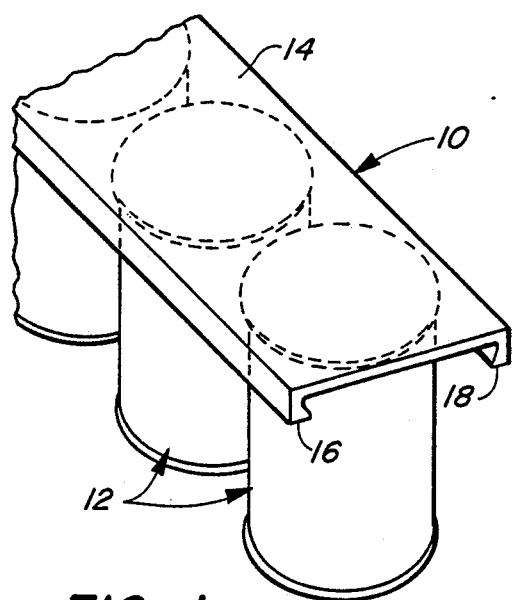
FIG._1.
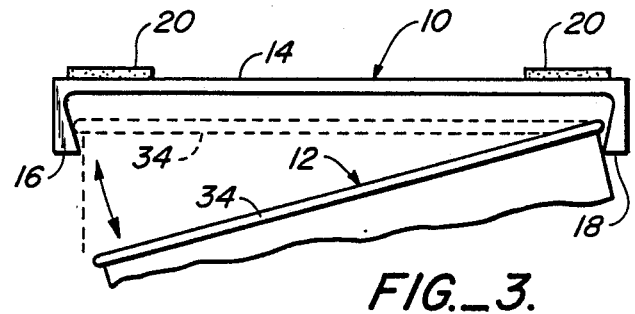
FIG._3.
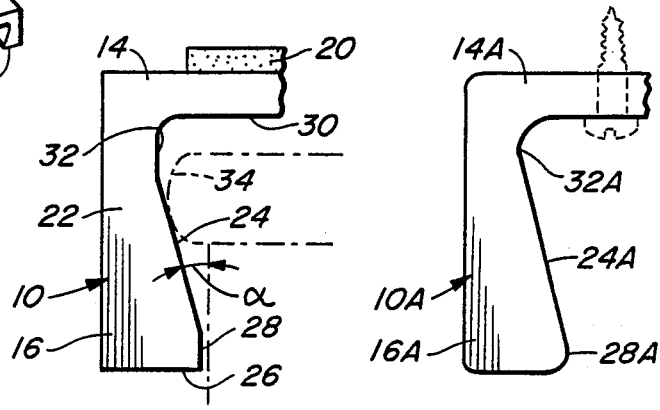
FIG._4.   FIG._5.
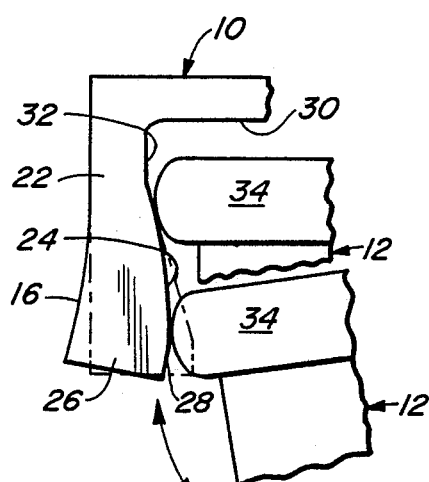
FIG._2.
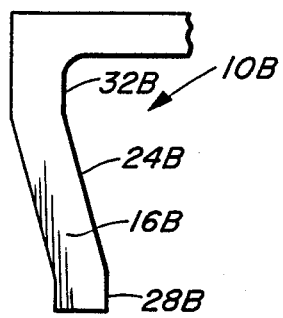
FIG._6.
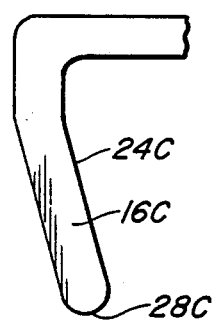
FIG._7.
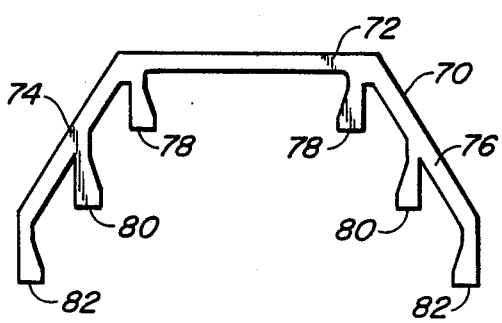
FIG._8.
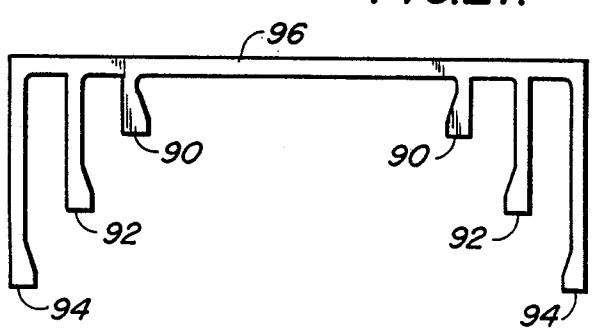
FIG._9.

DEVICE FOR RELEASABLY SUPPORTING A PLURALITY OF OBJECTS

TECHNICAL FIELD

This invention relates to a device for releasably supporting a plurality of objects and which allows the selective removal or replacement of any one of the objects without disturbing the others releasably supported thereby. The device has particular application to food cans, such as soup cans, but also may be utilized with other types of objects having a protrusion at an end thereof.

BACKGROUND ART

It is well known to support containers and similar objects having protrusions at the ends thereof by disposing supports under the protrusions and allowing the containers to depend or hang therefrom under the influence of gravity. For example, U.S. Pat. No. 1,134,277, issued Apr. 6, 1915, discloses a milk bottle lock in which the top portion of the bottle is inserted into a framework bottom opening. A locking member within the framework is positioned under the bottle protrusion or flange to lock the bottle top so that the bottle cannot be moved downwardly from the framework bottom to remove it, but instead must be slid endwise in the framework to accomplish this.

U.S. Pat. No. 4,022,363, issued May 10, 1977, shows a device for supporting and storing bottles in side-by-side fashion. Again, the device of this patent permits removal of the bottles only by sliding them endwise. This means that the bottles must be removed in serial fashion. If the user wishes to remove a particular bottle, he or she must first remove all bottles between it and a dispenser opening.

Another patent of interest is U.S. Pat. No. 1,995,370, issued Mar. 26, 1935. This patent relates to a conduit-holding clip device which employs a resilient finger to retain a plurality of pipes in side-by-side relationship. The device of this patent is not really appropriate for supporting objects having protrusions at the ends thereof, for example, cans sealed at their ends with ridges. The device of this patent is for the purpose of retaining conduits and similar articles which have different diameters. If the device of this patent were employed to support objects by their end protrusions, removal of any one thereof or replacement of any one thereof would result in deflection of the resilient finger to such an extent that at least some of the other objects retained thereby would fall from the device.

Another patent of some interest is U.S. Pat. No. 1,398,519 which relates to a hanger or holder for supporting articles of different sizes. In the device, two sets of jaws, one large and one small, are employed and such jaws are disposed in generally superposed relationship. The large jaws are meant to hold a single relatively large object while the small jaws are meant to hold a single relatively small object. The hanger of this patent, however, functions in such a manner that only a single object is retained thereby at any given time. In other words, there is no teaching in U.S. Pat. No. 1,398,519 of maintaining a plurality of objects in side-by-side relationship, much less the utilization of structure which will permit the removal or replacement of the one object without disturbing the others.

United Kingdom Patent Specification No. 2,038,613 discloses an article holder which is used to hold a plurality of objects, such as tools, pens and pencils, and the like in side-by-side relationship. The device or article holder comprises an elongate channel-shaped member having elongate flexible fins projecting toward each other from the side walls of the channel. Very resilient synthetic rubber material is employed in the device to construct the fins, for example, synthetic rubber of the type used to form seals in window double glazing units Articles allegedly may be inserted and removed from between the ribs without other objects dropping out. However, the holder can only be used for holding relatively light-weight objects. The device essentially relies upon a press-fit arrangement wherein sets of cooperating very resilient ribs frictionally engage the sides of objects placed therein. An article holder of that type cannot retain relatively heavy objects like food cans Not only are the ribs too resilient to accomplish this, but the arrangement disclosed does not, as distinguished from applicant's device, provide means for positively engaging the underside of a protrusion formed at the upper end of an object. For example, food cans conventionally incorporate a circumferentially extending protrusion or ridge at least one end thereof. British Specification No. 2,038,613 provides no teaching or suggestion whatsoever of utilizing such a protrusion to provide support for a can or similar object.

Applicant is also aware of U.S. Pat. No. 2,559,353 which relates to a mounting and protecting device for cathode ray tubes. This patent is of interest only by virtue of the fact that it discloses the general idea of mounting an object in a groove defined by flanges. The device of U.S. Pat. No. 2,559,353 would be totally inappropriate for use in supporting cans or similar objects. In any event, there is no teaching whatsoever of structure which allows the respective selective removal or replacement of objects disposed side-by-side without disturbing other objects releasably supported by the device.

U.S. Pat. No. 1,185,509, issued May 30, 1916, shows a holder for a single milk bottle or the like. The device has flanges forming grooves for receiving the bead of the bottle. The flanges resiliently urge the bottle into contact with an under surface of the device. There is no teaching that the bottle can be snapped in and out of position; apparently, it must be slid endwise relative to the groove for insertion and removal.

U.S. Pat. No. 4,071,218, issued Jan. 31, 1978, discloses a plastic clip for engaging the top chine of a single can to hold it for decorative display or utilitarian purposes. The single can is held at only one location on the chine, with the chine of a canted can resting on the shoulder of a fixed lip member and engaged by a flexible front wall spaced from the lip member. The can may be replaced and removed by bending the front wall. The device cannot be utilized to support a plurality of cans.

U.S. Pat. No. 3,527,345, issued Sept. 8, 1970, discloses a portable package for a row of containers. The containers are fixedly held in assembled relation by a channel-shaped strip of material having inturned and upturned flanges which engage the underside of container caps or rolled ends. The strip is simultaneously applied to all the containers by being forced vertically over the top thereof. The flanges enter a recess at the container necks and lock them into position against a cushion which resists movement of the containers. The patent is silent on how the containers are removed but it is apparent that downward removal of one or more of the containers is likely to break or permanently distort the flanges, rendering the device unfit for repeated use. In any event, there is no teaching that a single container can be removed or replaced without disturbing the other containers.

Other patents of which applicant is aware, but of even less pertinence to the present invention, are U.S. Pat. No. 3,062,490, issued Nov. 6, 1962; U.S. Pat. No. 278,161 issued May 22, 1883; U.S. Pat. No. 3,365,068, issued Jan. 23, 1968; Canadian Pat. No. 696,515, issued Oct. 27, 1964; and French Pat. No. 2,323,255.

DISCLOSURE OF INVENTION

The present invention relates to a device which releasably supports a plurality of objects in side-by-side relationship, each said object having a protrusion at an end thereof. The device allows the selective removal or replacement of any one of the objects without disturbing the other objects releasably supported by the device.

The device has particular application as a holder for food cans and the like. It enables the user to store a plurality of cans in side-by-side relationship from an overhead surface. For example, the device may be utilized in storage cabinets, thus freeing up shelf space.

A unique feature of the present device resides in the fact that any one of the objects being supported thereby in side- by-side relationship may be removed or replaced without disturbing other objects releasably supported thereby. Cans, for example, may be readily snapped in and out of position at any location on the device. The remaining cans will not fall out of position. The device positively engages the protrusion extending around the can or other object and provides the sole support for the object. This enables the device to be kept compact, an important consideration where storage is involved.

The device includes mounting means and spaced support elements extending downwardly from the mounting means. At least one of these support elements comprises a lip engageable with the protrusions of the objects being retained thereby and movable between a first position and a second position relative to the mounting means.

The lip includes a first portion having an inwardly and downwardly projecting first surface and a second lip portion connected to the first lip portion. The second lip portion has a second surface extending downwardly at an angle from the first surface.

The lip is formed of relatively hard, flexible material having an elastic memory whereby an outwardly directed force of predetermined magnitude applied to the second surface by one of the protrusions displaces the lip to a second position from a first position until the protrusion engages the first surface and whereby the first surface subsequently urges the protrusion upwardly when the elastic material of the lip material returns the lip to the first position.

The structural elements just described enable the protrusion of the can or other object to be snapped both into position and out of position. Because the lip is formed of relatively hard, flexible material having an elastic memory, the lip is deformed by the protrusion for just an instant as an object is removed or replaced. While this action occurs, there is virtually no deformation of the lip in the vicinity of adjacent objects. Such an arrangement provides many advantages over conventional holders for cans and similar objects which require endwise serial removal to reach a particular object held thereby.

Other features, advantages, and objects of the present invention will become apparent with reference to the following detailed description and accompanying drawings.

BRIEF DESCRIPTION OF DRAWINGS

FIG. 1 is a perspective view showing a portion of a preferred form of device constructed in accordance with the teachings of the present invention holding a plurality of cans;

FIG. 2 illustrates diagrammatically the cooperative relationship which exists between a lip of the device and a can protrusion when the can is being removed or replaced next to another can supported by the device;

FIG. 3 is an end view of the device of FIG. 1 illustrating a form of attachment means which ma be utilized to attach the device to an overhead location, and also showing a can being positioned in the device;

FIG. 4 illustrates details of a lip incorporated in the device of FIG. 1 with a portion of a can being supported thereby illustrated in phantom;

FIGS. 5, 6, and 7 are views similar to FIG. 4 but illustrating alternative forms of lip which may be employed on the device; and FIGS. 8 and 9 are end views showing alternative forms of the device constructed in accordance with the teachings of the present invention.

MODES FOR CARRYING OUT THE INVENTION

Referring now to FIGS. 1–4, a preferred form of device 10 constructed in accordance with the teachings of the present invention is illustrated. Device 10 is of a generally channel-like configuration and of a length sufficient to releasably support a plurality of objects such as cans 12 having body segments 13 having a predetermined outer diameter.

Device 10 includes mounting means in the form of a panel 14. A pair of support elements in the form of downwardly extending lips 16, 18 project from panel 14 along opposed edges thereof. Panel 14 and lips 16, 18 are integrally formed of plastic material such as poly vinyl chloride or polyethylene. The plastic material has a hardness within the range of from about 50 to about 90 on the Shore A hardness scale.

Panel 14 is adapted to be placed into face-to-face relationship with a horizontally disposed support surface such as underneath a pantry shelf. Any suitable means may be employed to secure the panel in such a location. In FIG. 3, for example, double-backed adhesive strips 20 are shown and may be utilized for such purpose.

In the embodiment under discussion, the support elements are identical in construction, virtually mirror images of one another. For this reason, only lip 16 will now be described in detail. Lip 16 includes a first lip portion 22 having an inwardly and downwardly projecting first surface 24. Lip 16 also includes a second lip portion 26 connected to the first lip portion, said second lip portion 26 having a second surface 28 extending downwardly at an angle from the first surface 24.

First lip portion 22 of lip 16 includes an inwardly disposed surface 32 which extends upwardly at an angle from first surface 24 to the bottom surface 30 of panel 14 to define a recess for accommodating the protrusion or ridge 34 of a can 12 as shown in phantom in FIGS. 3 and 4. The protrusion or ridge 34 has an outer diameter of predetermined magnitude and the distance between the edges of panel 14 is generally equal thereto. The protrusion outer diameter of course exceeds that of the can body segment 13. When cans 12 are being supported by device 10 the protrusions 34 thereof rest against first surface 24. Thus, the lips 16, 18 provide a positive means for supporting the end protrusions.

It is important that the lips 16, 18 be formed of relatively hard, flexible material having an elastic memory. This allows a can to be snapped quickly in and out and permits lip deformation only in the immediate vicinity of the particular can being removed or replaced. Otherwise, one or more of the other cans 12 might fall from the device under the influence of gravity. It will also be appreciated that the free distal ends of the lips 16, 18 must normally be spaced apart a distance less than the outer diameter of protrusion 34 to retain it in the device.

FIG. 3 perhaps shows best the technique utilized to snap a can in or out of position relative to device 10. When placing a can 12 into position the protrusion 34 thereof is positioned in the recess defined by the bottom surface 30 of panel 14 and the inwardly disposed surface 32 of one of the lips, in this case, lip 18. The can 12 is then pivoted about this location as shown in FIG. 3 to bring the other side of the protrusion 34 into engagement with the other lip, i.e., lip 16.

FIG. 2 shows the protrusion 34 of one can 12 engaging lip 16. Such engagement moves the lip 16 from a first position illustrated in phantom to a second position illustrated in solid line. The protrusion 34 first engages second surface 28. As soon as the protrusion 34 reaches the juncture between second surface 28 and first surface 24, the lip will immediately return toward the first position. This causes protrusion 34 to be cammed upwardly by first surface 24 into the recess defined by bottom surface 30 and inwardly disposed surface 32. It will be appreciated that, as shown in FIG. 2, when this operation takes place, other cans 12 disposed at the side of the can being inserted o replaced will remain in position.

Removal of any one of the cans is simply a matter of manually grasping the can and pivoting it about one of the lips. As soon as the protrusion disengages from second surface 28 of the other lip, such lip will immediately snap back into its first position.

FIG. 5 shows a slightly different lip configuration. Lip 16A includes a relatively elongated first surface 24A. At the lower end thereof, first surface 24A forms a juncture with a second surface 28A extending downwardly at an angle from the first surface but curved rather than straight as shown in the embodiment of FIGS. 1–4. Furthermore, the inwardly disposed surface 32A of the FIG. 5 embodiment is curved rather than straight as previously described with respect to the FIGS. 1–4 embodiment. Also, in the FIG. 5 embodiment, an aperture is formed in the panel 14A. A screw 33 or other fastener may be passed through the aperture as shown and comprise the means for attaching the device 10A.

The lip 16B of device 10B shown in FIG. 6 is similar to that of the FIGS. 1–4 embodiment. However, in the FIG. 6 embodiment, the lip is of an essentially uniform thickness throughout the full extent thereof. In other words, the outer wall of the lip has a contour essentially paralleling the first surface 24B, the second surface 28B, and the inwardly disposed surface 32B.

FIG. 7 lip 16C also has a generally uniform width. Moreover, in this particular embodiment 10C, first surface 24C terminates at the lower end thereof at a second surface 28C which curves downwardly at an angle from the first surface 24C and continues such curvature all the way around the lower edge of the lip 16C.

FIG. 8 shows an alternative embodiment of the device, said device being generally identified by reference numeral 70. In this embodiment, the panel includes a central panel 72 and auxiliary panels 74, 76 extending at an angle downwardly from the edges thereof. One pair of lips 78, which have the general overall configuration of the lips 16, 18 in the FIGS. 1–4 embodiment, project downwardly from central panel 72. Other pairs of lips 80 and 82 project downwardly from the auxiliary panels as shown. Because the lips of each pair of lips ar disposed at different distances from one another, each pair of lips can accommodate objects of different diameters. The lips of each pair of lips have distal ends located at different distance from the bottom surface of central panel 72.

In FIG. 9, yet another alternative form of the device 88 is illustrated. Here, three sets of lips 90, 92, and 94 project downwardly from a panel 96. It will be noted that in this particular embodiment the lengths of the lips of each pair of lips differ.

It will be appreciated that other modifications to the device may be made without departing from the spirit or scope of the present invention. For example, it is not necessary that the device be of single unitary construction. It is possible, for example, to have spaced support elements in the form of opposed lips project downwardly from separate mounting means. In other words each lip could be placed into position and supported separately. Also, the spaced support elements need not necessarily be o identical construction.

It will also be appreciated that the size and configuration of the device constructed in accordance with the teachings of the present invention will depend upon the nature and size of the objects to be supported. As an example, the following specifications have been found suitable for conventional soup cans. These cans are known in the industry as 210×315 cans, meaning that the cans are 2 and 10/66 inches in diameter and 3 and 15/16 inches high. Such cans have a body segment outer diameter of about 2.575 inches and a protrusion outer diameter of about 2.665 inches.

A device of the type shown in FIGS. 1–4 suitable for use with 210×315 cans has specifications as follows:

Distance between the distal ends of the lips at rest (first position) equals 2.575 inches;

Angle α (FIG. 4) formed between first surface 24 and second surface 28 equals 15 degrees; and Distance between inwardly disposed surface 32 of line 16, 18 equals 2.655 inches.

I claim:

1. A device for releasably supporting a plurality of containers, such as cans, in side-by-side relationship, each said container having a cylindrically-shaped body segment and a circumferentially extending protrusion at an end thereof, said device allowing the selective removal or replacement of any preselected one of said containers without substantially disturbing or causing removal of other containers releasably supported by the device immediately adjacent to said preselected one container, said device comprising, in combination:

mounting means; and spaced support elements extending from said mounting means in opposition to one another, at least one of said support elements comprising an elongated deformable lip engageable with said protrusions for supporting the protrusions of a plurality of containers disposed side-by-side and movable between a first position and a second position relative to said mounting means, said lip including a first lip portion having an inwardly and downwardly projecting first surface and a second lip portion connected to said first lip portion, said second lip portion having a second surface extending downwardly at an angle from said first surface, said lip being formed of relatively hard, flexible material having an elastic memory, said lip being displaced from said first position to said second position when an outwardly directed force of predetermined magnitude is applied to said second surface by an engaging protrusion of any preselected one of said containers at the location of said engaging protrusion until said engaging protrusion engages said first surface, said lip being responsive to engagement between said first surface and said engaging protrusion to subsequently immediately move toward the body segment of said preselected one container and cause said first surface to exert a camming force against said engaging protrusion and urge said engaging protrusion toward said mounting means due to the elastic memory of the lip material returning said lip toward said first position, said lip being deformed by the engaging protrusion only in the immediate vicinity of the preselected one container during removal or replacement thereof whereby all other containers supported by said device will remain supported thereby, said lip being selectively deformable by a container protrusion at any desired preselected location along the length of said lip.

2. The device according to claim 1 wherein said mounting means includes a panel having a bottom surface with spaced opposed edges, said spaced support elements each comprising lips of substantially identical construction extending from said edges and engageable with said protrusions.

3. The device according to claim 2 wherein said protrusions have an outer diameter of predetermined magnitude, the distance between said spaced edges being generally equal to said outer diameter whereby said containers are substantially solely supported on the first surfaces of said lips and slidable relative to said lips and positionable at any desired location along the length thereof.

4. The device according to claim 1 wherein said second surface is substantially straight.

5. The device according to claim 1 wherein said second surface is curved.

6. The device according to claim 1 wherein said mounting means and said spaced support elements are integrally formed of plastic material.

7. The device according to claim 6 wherein said material has a hardness within the range of from about 50 to about 90 on the Shore A hardness scale.

8. The device according to claim 1 wherein said first lip portion additionally has an inwardly disposed surface extending upwardly at an angle from said first surface to said mounting means for accommodating said protrusions have been urged upwardly by said first surface.

9. The device according to claim 2 wherein a plurality of pairs of lips project downwardly from said panel, the lips of each pair of lips being spaced at different distances from one another, said pairs of lips adapted to support containers of difference sizes.

10. The device according to claim 9 wherein each pair of lips have distal ends located at different distances from the panel bottom surface.

* * * * *